F. M. PATTERSON.
ROD FOR AXLES, STAY AND OTHER BOLTS, AND SIMILAR ARTICLES.
APPLICATION FILED JAN. 15, 1910.
959,159. Patented May 24, 1910.
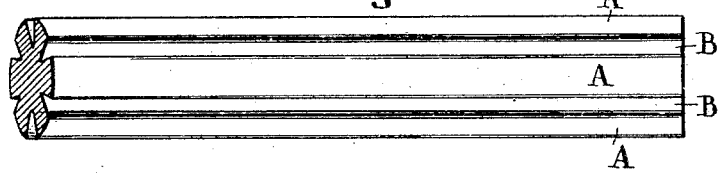 
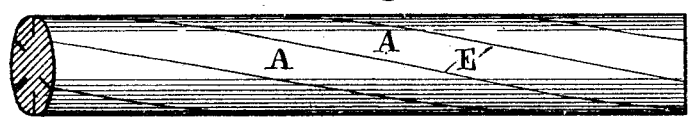 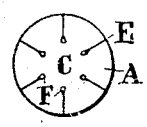
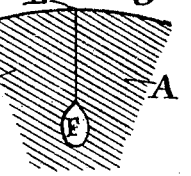 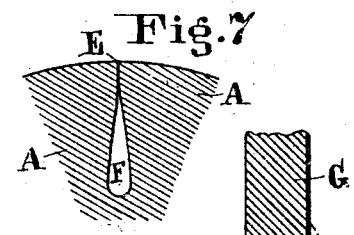
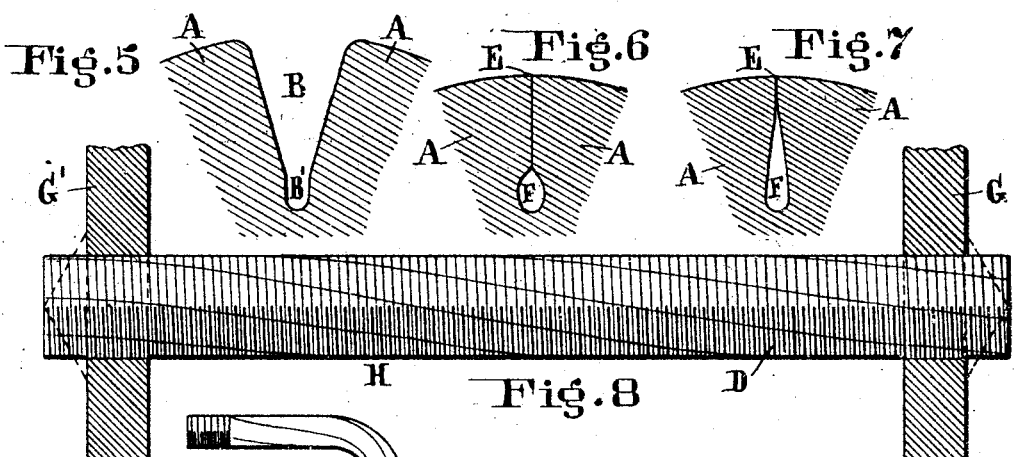
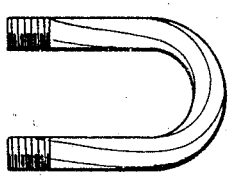 
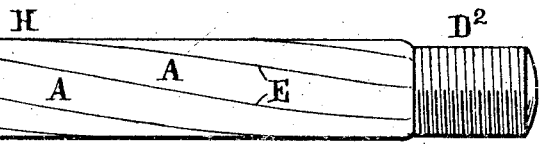
WITNESSES
E. H. Barlow
A. M. Kelly
INVENTOR
Franklin M. Patterson
BY
ATTORNEY

UNITED STATES PATENT OFFICE.

FRANKLIN M. PATTERSON, OF BAYONNE, NEW JERSEY, ASSIGNOR OF ONE-THIRD TO JOHN H. ALLEN, OF NEW YORK, N. Y., AND ONE-THIRD TO ALEXANDER B. SCULLY, OF CHICAGO, ILLINOIS.

ROD FOR AXLES, STAY AND OTHER BOLTS, AND SIMILAR ARTICLES.

959,159.     Specification of Letters Patent.     Patented May 24, 1910.

Application filed January 15, 1910. Serial No. 538,292.

*To all whom it may concern:*

Be it known that I, FRANKLIN M. PATTERSON, a citizen of the United States, and resident of the city of Bayonne and county of Hudson, State of New Jersey, have invented an Improvement in Rods for Axles, Stay and other Bolts, and Similar Articles, of which the following is a specification.

My invention has reference to rods for axles, stay and other bolts and similar articles, and consists of certain improvements largely relating to the structure set forth in Letters Patent 918,193 granted to me April 13, 1909, and which are fully set forth in the following specification and shown in the accompanying drawings which form a part thereof.

The object of my invention is to provide a construction of rod suitable for bolts which may be used as stay-bolts for boilers or employed for use in any other connection, or for axles, shafts etc., especially where elasticity and resistance to crystallization due to continued vibration is desired.

My object is further, to provide a rod suitable for the above purposes, which shall have flexibility and strength, and at the same time be inexpensive in construction.

My invention consists of a rod formed of a single piece of metal having radial incisions extending from the outer surface inwardly for a part of the radial distance, and terminating in longitudinal spaces or chambers and having a solid core with the series of integral longitudinal outer portions; and further in the structure above specified when twisted upon itself so that the longitudinal outer portions assume a helical form about a straight core.

My invention also comprehends details of construction which, together with the features above specified, will be better understood by reference to the drawings, in which:

Figure 1 is an elevation of a rod in process of construction to embody my invention; Fig. 2 is an end view of the same; Fig. 3 is an elevation of the same rod when reduced in diameter by rolling or drawing and twisted upon itself and embodying my invention; Fig. 4 is an end view of the rod shown in Fig. 3; Fig. 5 is an enlarged sectional view corresponding to one of the grooved portions in Fig. 2; Fig. 6 is a similar view corresponding to one of the radial incisions shown in Fig. 4; Fig. 7 is a view corresponding to Fig. 6 but slightly modified; Fig. 8 is an elevation of my invention in the form of a bolt employed as a stay-bolt for boilers and showing the same applied to the boiler sheets before the ends of the bolts are upset; Fig. 9 is an elevation of another form of bolt embodying my invention especially designed as a stay-bolt; Fig. 10 is an elevation of my improved bolt in the form of a U bolt; and Fig. 11 shows my improved bolt with a head upset on one end, and the other end screw threaded.

My improved rod may be made in any suitable manner, but for economy I prefer to make it by the following method. A rod of steel is drawn through suitable dies having cutting blades which produce incisions B of substantially V-shape longitudinally of the rod, so as to form a series of longitudinal outer portions A integrally connected with the center or core C, as clearly shown in Figs. 1 and 2. This operation may be done while the metal is hot. Instead of drawing the bar through a die, it may be given the incisions B by means of suitable dies employed in a hydraulic or other press, or the grooves may be rolled into the bar in any suitable manner.

It is immaterial to my invention how the incisions or grooves B are formed in the bar, and while I prefer to make them straight in the first operation of making the bolt, they may be made in helical form approximating the shape shown in Fig. 2, with the helical character indicated in Fig. 3. When making the incisions B, the bottoms of said incisions are preferably made as indicated at B' in Fig. 5, so that when the incisions B are closed up in later operations, the sides of said incisions adjacent to the bottom will not be brought into close contact. I do not restrict myself to the particular cross section of these incisions, as they may be made in various shapes while keeping within the invention herein described. After having made the rod with the cross section shown in Fig. 2, I then draw or pass it through other dies to reduce its diameter and close the incisions B adjacent to the outer surface as indicated at E in Fig. 4, in which the opposing walls of the adjacent parts A A contact with each other, and the rod on its outer surface is continuous, except for the incisions E, which at said outer surface have no approximate width.

During the operation just described of closing the grooved portions B, the walls of the longitudinal parts A will be brought together for a distance inward from the surface, but will leave the longitudinal chambers or spaces at the bottom or inner end substantially as indicated at F in Fig. 6. If desired, the spaces may be increased in area by not forcing the walls of the parts A A together so far inward, this latter construction being indicated in Fig. 7.

It will now be understood that the rod, when formed of a diameter corresponding to Figs. 3 and 4, will contain a solid core with a series of radial portions A separated by spaceless incisions at the outer surface and provided, adjacent to the bottom of said incisions, with longitudinal chambers or spaces throughout the length of the rod. It is preferred that in the compressed form of the rod, such as indicated in Fig. 4, the cross sectional area of the center or core part C will approximately equal the cross sectional area of the parts A surrounding it so that the entire rod is subdivided into longitudinal portions which approximately correspond in sectional area, the outer set being grouped about the central core and connected with it.

During the compression of the rod of Fig. 1 into the diameter as indicated in Fig. 3, or as a subsequent operation thereto, the rod may be twisted upon itself so as to cause the outer portions A to take a helical form about the straight core, such helical or twisted form being shown in Figs. 3, 8, 9, 10 and 11. During this twisting operation, it is evident that the core will be more or less twisted also, and consequently the longitudinal chambers F will likewise assume a helical form about the axis of the bolt.

I do not restrict myself with respect to the pitch of the helical twist, but prefer that it shall be such, in a stay-bolt for boilers, that the full pitch would equal approximately twice the length of the stay-bolt between the boiler sheets to be stayed, as indicated in Fig. 8, in which H is the stay-bolt having its surface screw threaded as at D, and G′ G are the boiler sheets to be stayed.

After the rod has been brought to the form shown in Figs. 3 and 4, it may be screw threaded from one end to the other when it is to be employed for stay-bolt purposes, said screw threading being indicated at D in Fig. 8, so that, when the rod is cut up into the proper lengths for use as stay-bolts H, said bolts may be screwed into the screw threaded holes in the outer sheets G of the fire-box and into the fire-box sheet G′, preliminary to being upset or riveted on its ends, as indicated in dotted lines.

In place of making the rod in long lengths and cutting it into shorter lengths to form stay-bolts, I may make each stay-bolt separately of the form shown in Fig. 9. In this case the body is of substantially the form described, but the ends are solid, since the incisions E do not extend to the extreme ends of the bolt. These ends may be of different diameters and each screw threaded, one end D′ being larger in diameter than the body portion, and the other end $D^2$ being smaller than the body portion. The larger end may also have a part I made square or of other form for receiving a wrench or other tool with which to rotate the bolt when applying it to the boiler sheets. In this form of stay-bolt, the body part between the ends need not be screw threaded. It is also evident that, by making the rod, shown in Figs. 3 and 4, sufficiently large in diameter, it may be turned, rolled or otherwise reduced to the multiple diameters such as shown in Fig. 9, and under such conditions, be screw threaded on the ends alone. In the form of bolt shown in Fig. 10, I have simply employed a portion of the twisted rod shown in Fig. 3 bent into U shape and having its end screw threaded to receive nuts. In the form shown in Fig. 11, the head is indicated as upset to the usual square form, and the other end of the bolt is screw threaded to receive a nut. My bolts may be of any suitable form, so long as the construction of the body part conforms to the requirements of my invention.

By dividing the outer portion of the rod into the longitudinal portions A, I obtain great flexibility without loss in tensile strength and this strength is increased by the helical form given to the said outer portions. Furthermore, the helical twist given to the said outer portions will, in the preferred form of stay-bolt, bring the fibers which are at the top at one end to the bottom at the other end, and consequently, those fibers which are under tension at one place of their length are under compression at another, the result being that these strains compensate and the said fibers of the parts A are at no time put under rupturing strains, no matter how severe the normal strain to which they may be subjected during commercial use. The same action takes place when the bolt is bent in any direction. These bolts may be tempered, if so desired, at any stage in their construction. By employment of my invention as a stay-bolt for boilers, the usual expansion and contraction of the fire-box may take place without danger of destroying the bolts.

Aside from the use of my improved rod for the manufacture of bolts, it may be employed for shafts, axles, cranks and like articles which are subjected to vibration and torsional strain. In a car axle, the parts adjacent to the journals would be about the normal diameter of my improved rod and the middle intervening part reduced by drawing or rolling. The journals may be turned or rolled down. In a carriage or wagon axle, the parts adjacent to the journals may be of the normal diameter of my improved rod from which it is made, the axle proper intervening may be squared in cross section, and the journals may be made by rolling or turning. In a form of rear semi-axle section for automobiles the main body may be of the normal diameter of the rod, the part or collar next to the journal may be upset thereon, and the journal may be rolled or turned. Crank shafts may also be formed from my improved rod by proper forging. These are mentioned as examples of uses to which my improved bar may be put.

An important part of my invention resides in the provision of a plurality of longitudinal spaces or chambers F arranged at the inner parts of the incisions E, as I have found that by providing such longitudinal spaces, crystallization of the metal is prevented. By actual experience, I have found, for example, that my improved bolts, when subjected to conditions of great vibration, are greatly superior to solid bolts, the possible length of duration of use of my improved bolt being approximately three times that of solid steel bolts employed under the same conditions. This feature is manifestly of great importance in a bolt of this construction because the great danger which exists to rupturing solid bolts by crystallization due to vibration, is greatly overcome.

While I prefer that the longitudinal chambers or spaces F shall be of the character and size indicated in the drawings, nevertheless these spaces may be greater or less than that shown, but in all cases are sealed within the body of the rod or bolt by the closing of the side walls of the parts A in the formation of the closed incisions E adjacent to the circumference of the rod or bolt. It is also evident that while it is preferable to give to the rod or bolt the helical arrangement of the parts A, incisions E and longitudinal spaces or chambers F, this helical character may be omitted if so desired; it is, however, preferred in all cases where the rod, shaft or bolt is subjected to flexure or vibration.

All that has been stated with reference to the use of my invention in the form of a rod or bolt equally applies to axles and cranks, and similar articles where great vibration with or without torsional strain results.

I have shown my improved invention in the forms which I have found preferable in commercial practice, but I do not confine myself thereto, as the mode of manufacture and details of construction may be varied without departing from the spirit of the invention.

Having now described my invention, what I claim as new and desire to secure by Letters Patent, is:

1. An article of the character described formed of a core portion and a series of radial longitudinal outer portions divided with respect to each other but integral with the core portion, and said series of radial outer portions being closely compacted side by side at their outer portions and separated at their inner portions adjacent to the core.

2. An article of the character described formed of a core portion and a series of radial longitudinal outer portions divided with respect to each other but integral with the core portion, and said series of radial outer portions being closely compacted side by side at their outer portions and separated at their inner portions adjacent to the core, and in which the longitudinal outer portions are helically arranged about the core portion.

3. An article of the character described formed of a core portion and a series of radial longitudinal outer portions divided with respect to each other but integral with the core portion, and said series of radial outer portions being closely compacted side by side at their outer portions and separated at their inner portions adjacent to the core to form longitudinal chambers and in which both the longitudinal outer portions and chambers are helically arranged about the axis of the core.

4. An article of the character described formed of a core portion and a series of radial longitudinal outer portions divided with respect to each other but integral with the core portion and in which the longitudinal outer portions are helically arranged about the core portion and compressed into close contact for a part of their radial length so as to form a solid rod with helically arranged spaceless incisions at the outer surface and a plurality of longitudinal passages lengthwise of the bolt and between the axis and outer surface thereof.

5. An article of the character described formed of a core portion and a series of radial longitudinal outer portions divided with respect to each other but integral with the core portion, and said series of radial outer portions being closely compacted side by side at their outer portions and separated at their inner portions adjacent to the core, and in which the longitudinal outer portions are helically arranged about the core portion, and further having screw threads upon its outer surface.

6. An article of the character described formed of a core portion and a series of longitudinal outer portions integral with and helically arranged around the core and forming between them inclosed longitudinal chambers.

7. An article of the character described formed of a core portion and a series of radial longitudinal outer portions integral with the core portion and being closely compacted throughout their length side by side at their outer portions and separated slightly between their sides at their inner portions, the core portion and the radial longitudinal outer portion being each of approximately the same cross sectional area.

8. An article of the character described formed of a core portion and a series of radial longitudinal outer portions divided with respect to each other but integral with the core portion, and said series of radial outer portions being closely compacted side by side at the outer surface, and in which the body is provided with one or more longitudinal compartments within it and between the core and outer surface.

9. An article of the character described formed of a core portion and a series of radial longitudinal outer portions divided with respect to each other but integral with the core portion and said series of radial outer portions being closely compacted side by side at the outer surface, and in which the body is provided with one or more longitudinal compartments within it and between the core and outer surface, and the entire body and longitudinal compartment spirally twisted whereby the said radial portions and longitudinal compartment or compartments assume a spiral arrangement about the core.

10. A bolt formed of a core portion and a series of radial longitudinal outer portions divided with respect to each other but integral with the core portion and in which the longitudinal outer portions are helically arranged about the core portion and compressed into close contact for a part of their radial length so as to form a solid rod with helically arranged spaceless incisions at the outer surface and a plurality of longitudinal passages lengthwise of the bolt and between the axis and outer surface thereof, and further having screw threads upon its outer surface throughout its entire length and extending over the spaceless incisions.

11. A bolt formed of a core portion and a series of longitudinal outer portions integral with and helically arranged around the core and forming between them inclosed longitudinal chambers, the said bolt having screw threads at one or more places in its length.

12. A bolt having a body portion less than its whole length formed of a core portion surrounded with a series of integral longitudinal outer portions helically arranged so that the helical twist is extended through approximately 180 degrees, and in which there are longitudinal chambers arranged between the longitudinal outer portions and inclosed by them.

13. A bolt formed of a core portion and a series of radial longitudinal outer portions integral with the core portion and being closely compacted throughout their length side by side at their outer portions and separated slightly between their sides at their inner portions, said bolt also having screw threaded ends, one of which ends is of smaller and the other of which is of larger diameter than the middle or body portion.

In testimony of which invention, I hereunto set my hand.

FRANKLIN M. PATTERSON.

Witnesses:
R. M. HUNTER,
R. M. KELLY.